US010678122B2

(12) United States Patent
Pan et al.

(10) Patent No.: US 10,678,122 B2
(45) Date of Patent: Jun. 9, 2020

(54) WAVELENGTH CONVERSION DEVICE

(71) Applicant: Coretronic Corporation, Hsin-Chu (TW)

(72) Inventors: Haw-Woei Pan, Hsin-Chu (TW); Chih-Hsien Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/234,511

(22) Filed: Dec. 27, 2018

(65) Prior Publication Data

US 2019/0196315 A1  Jun. 27, 2019

(30) Foreign Application Priority Data

Dec. 27, 2017 (CN) .......................... 2017 1 1441834

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/208* (2013.01); *G03B 21/2066* (2013.01)

(58) Field of Classification Search
None
See application file for complete search history.

(56) References Cited

U.S. PATENT DOCUMENTS

| 9,441,812 B2* | 9/2016 | Liao .......................... F21V 9/40 |
| 2006/0007407 A1 | 1/2006 | Matsui |
| 2013/0242534 A1 | 9/2013 | Pettitt et al. |
| 2014/0022760 A1 | 1/2014 | Hartwig |
| 2014/0362349 A1* | 12/2014 | Chiu .................... G03B 21/204 353/31 |
| 2015/0167907 A1 | 6/2015 | Hoehmann |
| 2015/0316775 A1* | 11/2015 | Hsieh ................. G03B 21/2013 353/31 |
| 2018/0173087 A1 | 6/2018 | Hsieh et al. |

FOREIGN PATENT DOCUMENTS

| CN | 201852981 | 6/2011 |
| CN | 102147591 | 8/2011 |
| CN | 102418907 | 4/2012 |

(Continued)

*Primary Examiner* — Ashok Patel

(57) ABSTRACT

The invention provides a wavelength conversion device, including a first wavelength conversion portion and a second wavelength conversion portion. The second wavelength conversion portion includes a wavelength maintenance zone and a plurality of wavelength conversion structures. When the second wavelength conversion portion is switched onto a transmission path of the excitation beam, a portion of the excitation beam is incident on the wavelength maintenance zone and becomes a second color beam, and another portion of the excitation beam is incident on the wavelength conversion structures and converted into a predetermined color beam. A first chromaticity coordinate value of the second color beam in color space is (x, y), a second chromaticity coordinate value of the second color beam, after being combined with the predetermined color beam by the dichroic element, in the color space is (x', y'), and x'≤x and y'≥y.

13 Claims, 7 Drawing Sheets

(56) References Cited

FOREIGN PATENT DOCUMENTS

| | | |
|---|---|---|
| CN | 102563410 | 7/2012 |
| CN | 102193296 | 3/2013 |
| CN | 103283046 | 9/2013 |
| CN | 103453448 | 12/2013 |
| CN | 102707551 | 4/2015 |
| CN | 102289141 | 7/2015 |
| CN | 204593250 | 8/2015 |
| CN | 105353578 A | 2/2016 |
| CN | 104238248 | 7/2016 |
| JP | 2012159603 | 8/2012 |
| JP | 2012185369 | 9/2012 |
| JP | 2015184407 | 10/2015 |
| TW | I260923 | 8/2006 |
| TW | I370316 | 8/2012 |
| TW | I504832 | 10/2015 |
| TW | I540377 | 7/2016 |
| TW | M529190 | 9/2016 |
| TW | M547687 | 8/2017 |
| TW | I605295 | 11/2017 |
| TW | 201822184 A | 6/2018 |

\* cited by examiner

WAVELENGTH CONVERSION DEVICE

CROSS-REFERENCE TO RELATED APPLICATION

This Application Claims the Priority Benefit of China Application (CN201711441834.6 Filed on 2017 Dec. 27). The Entirety of the Above-Mentioned Patent Application is Hereby Incorporated by Reference Herein and Made a Part of this Specification.

FIELD OF THE INVENTION

The invention relates to a wavelength conversion device, and more particularly to a wavelength conversion device for projectors.

BACKGROUND OF THE INVENTION

Current architectures of projectors mainly include an illumination system, a light valve, and a projection lens. The illumination system is used for providing an illumination beam. The light valve is used for converting the illumination beam into an image beam. The projection lens is used for projecting the image beam onto a screen to form image pictures on the screen. The illumination system can generate illumination beams of different colors. A main principle is to excite phosphors on phosphor wheels through the light emitted from laser diodes having good luminous efficiency, and thereby to generate a desired pure color light source.

In light path architectures of projectors, a source of blue color light in the image pictures is a blue laser diode. In order to excite the phosphors on the phosphor wheels and achieve good efficiencies for conversion to different color lights, laser diodes that can emit short-wavelength blue light (i.e., blue light with a wavelength less than 445 nm) are used. But the short-wavelength blue light is a purplish blue light in the sense of human eyes. Therefore, in order to improve the quality of the image pictures, the purplish blue light must be adjusted to a blue light close to bluish. However, laser diodes have extremely narrow bandwidth with monochromaticity. Chromaticity coordinate values of the blue light, emitted by the laser diodes, in CIE1931 color space have been very close to critical values of the color space. Thus, the purplish blue light cannot be further purified through multicolor light filters to achieve desired chromaticity coordinate values in the color space.

Therefore, how to improve above-mentioned problems is really a focus for relevant people in the field.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One of the objectives of the invention is to provide a wavelength conversion device for use in projectors, thereby improving the quality of image pictures projected by the projectors.

Other objectives and advantages of the invention can be further understood from the technical features disclosed in the invention.

In order to achieve one or a portion of or all of the objectives or other objectives, the invention provides a wavelength conversion device for a projection system. The projection system includes a light source device and a dichroic element. The light source device provides an excitation beam. The wavelength conversion device is located on a transmission path of the excitation beam. The wavelength conversion device includes a first wavelength conversion portion and a second wavelength conversion portion. The first wavelength conversion portion is configured with at least one wavelength conversion material, and is used for receiving the excitation beam emitted from the light source device and converting the excitation beam into a first color beam. The second wavelength conversion portion includes a wavelength maintenance zone and a plurality of wavelength conversion structures. The second wavelength conversion portion and the first wavelength conversion portion are alternately switched onto the transmission path of the excitation beam. When the second wavelength conversion portion is switched onto the transmission path of the excitation beam, a portion of the excitation beam is incident on the wavelength maintenance zone and becomes a second color beam, and another portion of the excitation beam is incident on the wavelength conversion structures and converted into a predetermined color beam. A first chromaticity coordinate value of the second color beam in color space is (x, y). A second chromaticity coordinate value of the second color beam, after being combined with the predetermined color beam by the dichroic element, in the color space is (x', y'), and x'≤x and y'≥y.

The wavelength conversion device of the embodiment of the invention is used in projectors and includes the first wavelength conversion portion and the second wavelength conversion portion. The second wavelength conversion portion includes a wavelength maintenance zone and a plurality of wavelength conversion structures. In such a structural design, when the second wavelength conversion portion is switched onto the transmission path of the excitation beam, a portion of the excitation beam is incident on the wavelength maintenance zone such that the excitation beam is maintained as blue color light, and another portion of the excitation beam is incident on the wavelength conversion structures and converted into yellowish or greenish color light. After purplish blue light is combined with the yellowish or greenish color light through the dichroic element, the purplish blue light is adjusted to bluish color light. The quality of the image pictures projected by the projectors is thereby enhanced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
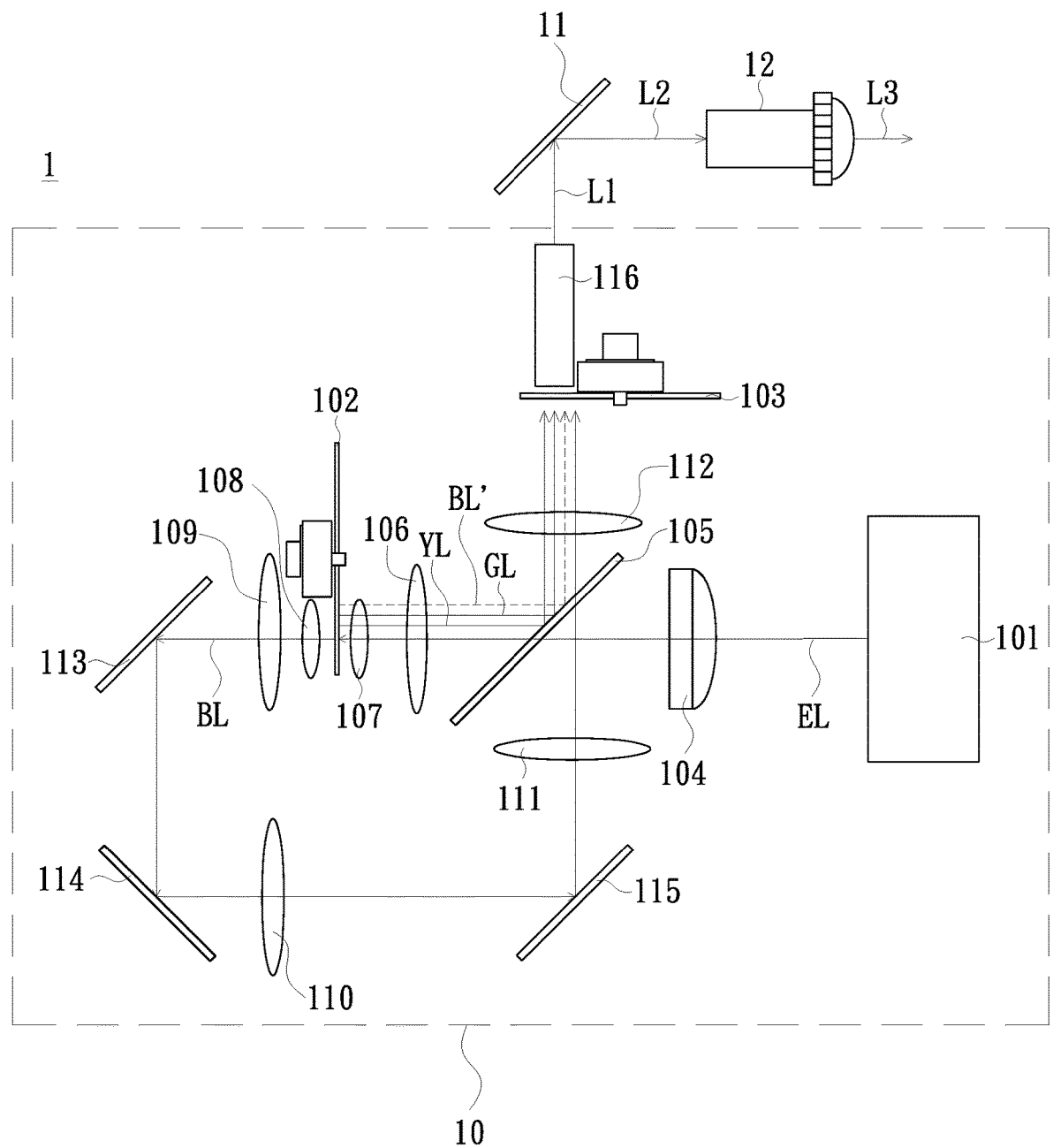
FIG. 1 is a schematic architecture diagram of a projection system according to an embodiment of the invention.

FIG. 1 is a schematic architecture diagram of a projection system 1 according to an embodiment of the invention. As shown in FIG. 1, the projection system 1 of the embodiment includes a light source module 10, a light valve 11, and a lens 12. The light source module 10 is for providing an illumination beam L. The light valve 11 is located on a transmission path of the illumination beam L1 and is used for receiving the illumination beam L to generate an image beam L2. In the embodiment, the light valve 11 may be a digital micromirror device (DMD), a liquid crystal on silicon (LCoS), or a liquid crystal display (LCD) panel, but the invention is not limited thereto. The lens 12 is located on a transmission path of the image beam L2. After passing through the lens 12, the image beam L2 becomes a projection beam L3. In the embodiment, the light source module 10 includes a light source device 101, a wavelength conversion device 102, and a dichroic element 105. The light source device 101 provides an excitation beam EL. The wavelength conversion device 102 is disposed on a transmission path of the excitation beam EL. In the embodiment, the dichroic element 105 is, for example, a dichroic mirror or a dichroic prism located between the wavelength conversion device 102 and the light source device 101, but the invention is not limited thereto.

Figure 2:
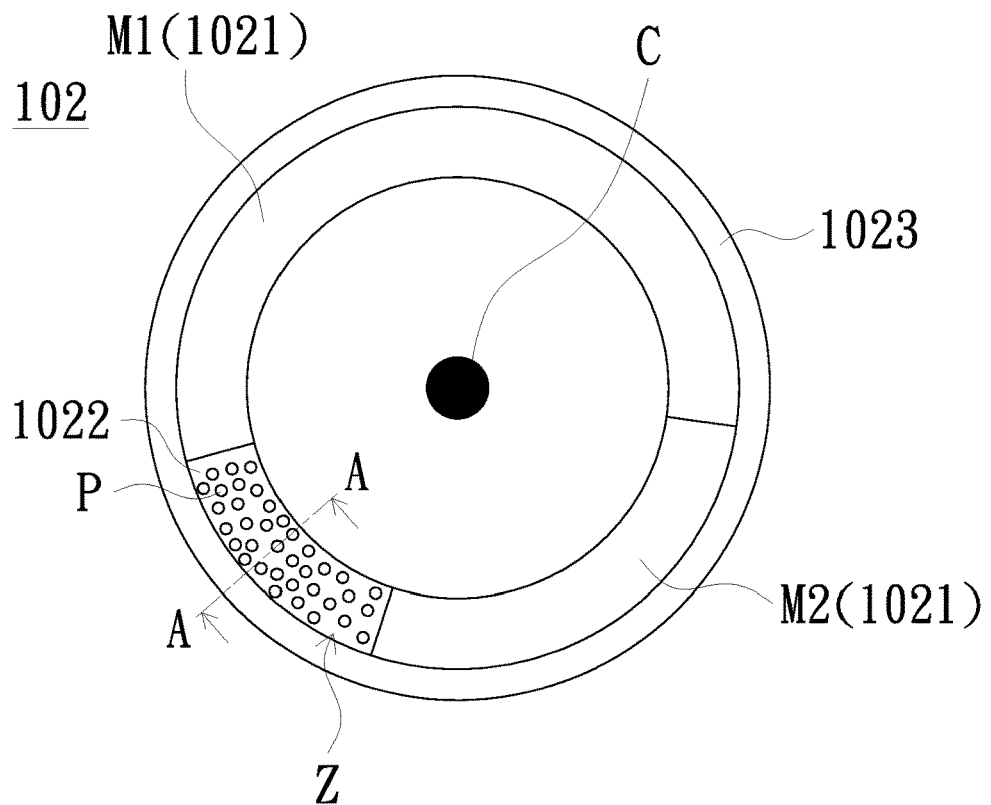
FIG. 2 is a schematic structure diagram of a wavelength conversion device shown in FIG. 1.
Figure 3:
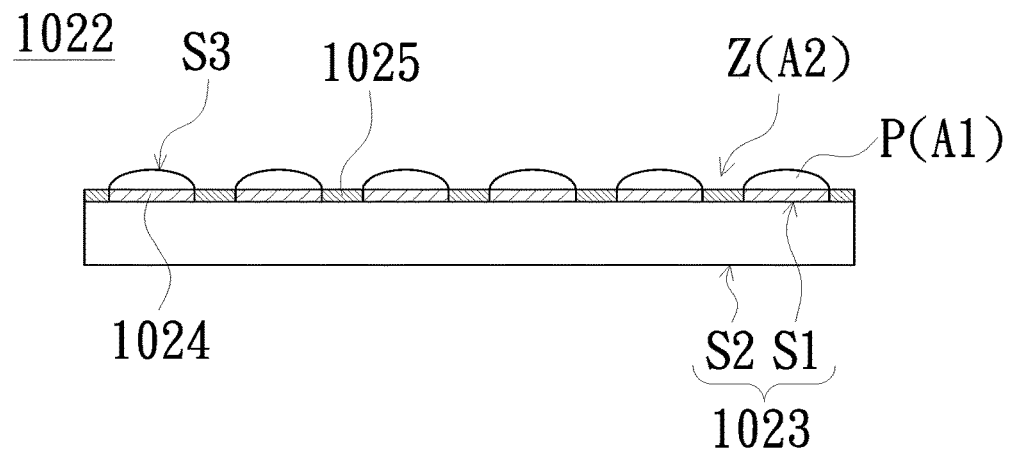
FIG. 3 is a schematic cross-sectional view along line A-A shown in FIG. 2.
Figure 4:
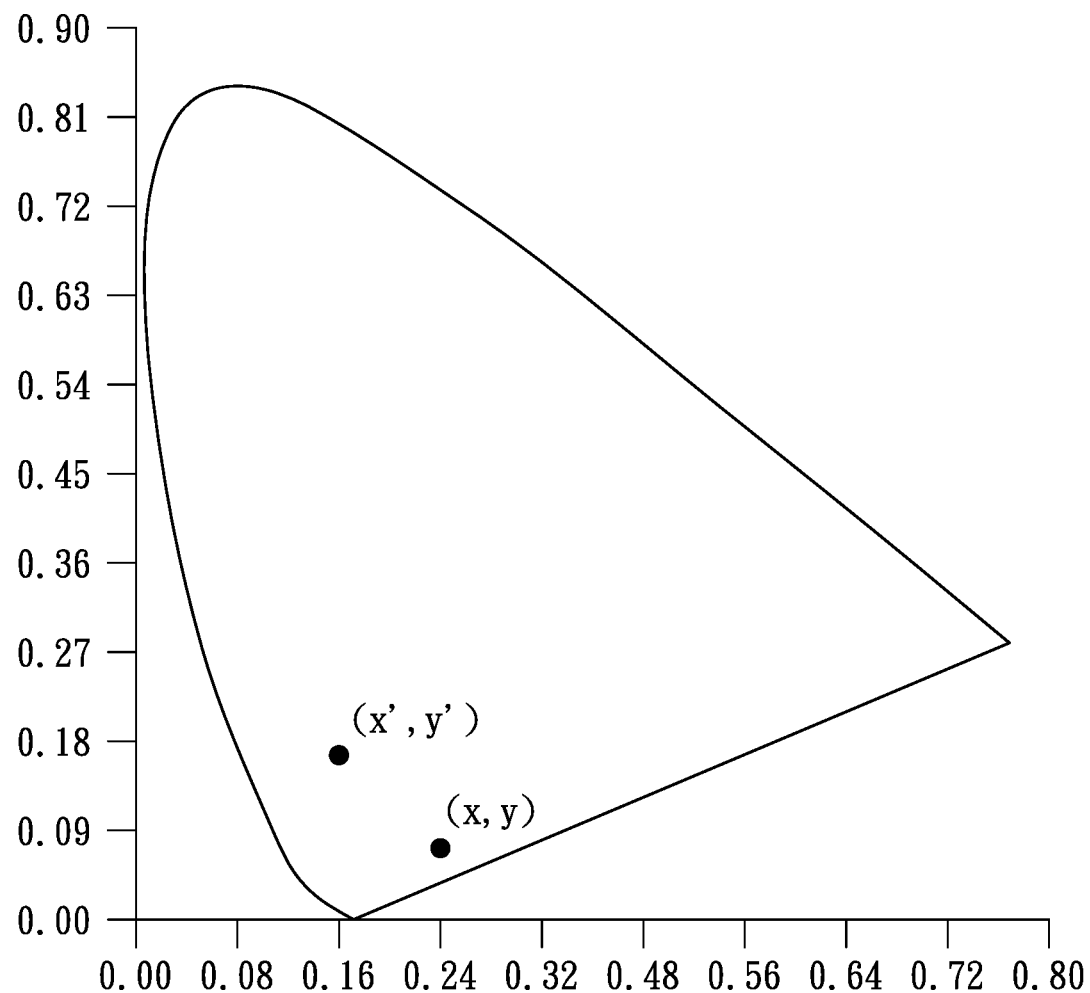
FIG. 4 is a schematic adjustment diagram of display colors of the projection system of the embodiment in a chromaticity diagram.

FIG. 2 is a schematic structure diagram of the wavelength conversion device 102 shown in FIG. 1. FIG. 3 is a schematic cross-sectional view along line A-A shown in FIG. 2. FIG. 4 is a schematic adjustment diagram of display colors of the projection system 1 of the embodiment in a chromaticity diagram. As shown in FIG. 1 to FIG. 3, the wavelength conversion device 102 of the embodiment includes a first wavelength conversion portion 1021 and a second wavelength conversion portion 1022. The first wavelength conversion portion 1021 is configured with at least one wavelength conversion material. The second wavelength conversion portion 1022 includes a wavelength maintenance zone Z and a plurality of wavelength conversion structures P. In the embodiment, the first wavelength conversion portion 1021 and the second wavelength conversion portion 1022 of the wavelength conversion device 102 are alternately switched onto the transmission path of the excitation beam EL. When the first wavelength conversion portion 1021 is switched onto the transmission path of the excitation beam EL, the wavelength conversion material of the first wavelength conversion portion 1021 converts the excitation beam EL into a first color beam YL. When the second wavelength conversion portion 1022 is switched onto the transmission path of the excitation beam EL, a portion of the excitation beam EL is incident on the wavelength maintenance zone Z and becomes a second color beam BL, and another portion of the excitation beam EL is incident on the wavelength conversion structures P and converted into a predetermined color beam BL'. For further explanation, the number of the wavelength conversion materials disposed on the first wavelength conversion portion 1021 of the embodiment is, for example, two, that is, a first wavelength conversion material M1 and a second wavelength conversion material M2. But the invention does not limit the number of the wavelength conversion material. In the embodiment, the first wavelength conversion material M1 of the first wavelength conversion portion 1021, the second wavelength conversion material M2 of the first wavelength conversion portion 1021, and the second wavelength conversion portion 1022 of the wavelength conversion device 102 are alternately switched onto the transmission path of the excitation beam EL. When the first wavelength conversion material M1 of the first wavelength conversion portion 1021 is switched onto the transmission path of the excitation beam EL, the first wavelength conversion material M1 converts the excitation beam EL into a first color beam YL. When the second wavelength conversion material M2 of the first wavelength conversion portion 1021 is switched onto the transmission path of the excitation beam EL, the second wavelength conversion material M2 converts the excitation beam EL into a third color beam GL. In the embodiment, a conversion rate, with which the excitation beam EL is incident on the first wavelength conversion material M1 of the first wavelength conversion portion 1021 and converted into the first color beam YL, is greater than or equal to 90%. A conversion rate, with which the excitation beam EL is incident on the second wavelength conversion material M2 of the first wavelength conversion portion 1021 and converted into the third color beam GL, is greater than or equal to 90%. As shown in FIG. 4, in the embodiment, a first chromaticity coordinate value of the second color beam BL in color space is (x, y). A second chromaticity coordinate value of the second color beam BL, after being combined with the predetermined color beam BL' through the dichroic element 105, in the color space is (x', y'), wherein x'≤x and y'≥y. In other words, with the structural design of the wavelength conversion device 102 of the embodiment, an objective of adjusting the color of the second color beam BL can be achieved. The quality of image pictures projected by projectors is thereby enhanced.

It should be particularly noted that in the embodiment, the wavelength conversion structures P of the second wavelength conversion portion 1022 are disposed at intervals. The wavelength maintenance zone Z is an area in the second wavelength conversion portion 1022 where the wavelength conversion structures P are not disposed. In the embodiment, the excitation beam EL is, for example, a blue beam. The first wavelength conversion material M1 is, for example, a yellow phosphor that can convert the excitation beam EL into a yellow beam. The first color beam YL is, for example, a yellow beam. The second wavelength conversion material M2 is, for example, a green phosphor that can convert the excitation beam EL into a green beam. The third color beam GL is, for example, a green beam. Since the wavelength of the excitation beam EL does not change after the excitation beam EL is incident on the wavelength maintenance zone Z (the area where the wavelength conversion structures P are not disposed), the second color beam BL is still a blue beam. The predetermined color beam BL' is, for example, a greenish or yellowish beam. The dichroic element 105 can, for example, allow a blue beam to pass therethrough while reflecting other color beams. In the embodiment, the first chromaticity coordinate value (x, y) of the second color beam BL in the color space, and the second chromaticity coordinate value (x', y') of the second color beam BL, after being combined with the predetermined color beam BL' through the dichroic element 105, in the color space, are CIE1931 chromaticity coordinates, respectively.

The following further describes the detailed structure of the wavelength conversion device 102 and the detailed structure of the projection system 1 in the embodiment.

As shown in FIG. 1, the projection system 1 of the embodiment further includes a collimation element 104, a color separating element 103, lenses 106, 107, 108, 109, 110, 111 and 112, reflective elements 113, 114 and 115, and an integration rod 116. The dichroic element 105 of the embodiment is, for example, an optical element that can allow the second color beam (a blue beam) to pass therethrough while reflecting other color beams. The color separating element 103 may be a color wheel suitable for rotation. The excitation beam EL provided by the light source device 101 passes through the dichroic element 105 after passing through the collimation element 104, and then passes through the lenses 106 and 107 and irradiates the rotatable wavelength conversion device 102. The excitation beam EL sequentially irradiates the first wavelength conversion material M1 of the first wavelength conversion portion 1021 of the wavelength conversion device 102, the second wavelength conversion material M2 of the first wavelength conversion portion 1021, and the second wavelength conversion portion 1022. The excitation beam EL irradiates the first wavelength conversion material M1 and generates the first color beam YL by excitation. The excitation beam EL irradiates the second wavelength conversion material M2 and generates the third color beam GL by excitation. The first color beam YL and the third color beam GL are respectively reflected to the dichroic element 105. Then, the first color beam YL and the third color beam GL pass through the lens 112, after being respectively reflected by the dichroic element 105, and irradiate a rotatable color wheel 103. The first color beam YL and the third color beam GL enter the integration rod 116 after passing through the color wheel 103. On the other hand, a portion of the excitation beam EL passes through the wavelength maintenance zone Z and becomes the second color beam BL. The second color beam BL irradiates the color wheel 103 after sequentially passing through the lenses 108, 109, the reflective elements 113, 114, the lens 110, the reflective element 115, the lens 111, the dichroic element 105, and the lens 112. Another portion of the excitation beam EL is incident on the wavelength conversion structures P and converted into the predetermined color beam BL'. The predetermined color beam BL' is reflected back to the dichroic element 105. Then, after being reflected by the dichroic element 105, the predetermined color beam BL' passes through the lens 112 and irradiates the rotatable color wheel 103. After being combined at the dichroic element 105, the second color beam BL from the wavelength maintenance zone Z and the predetermined color beam BL' from the wavelength conversion structures P pass through the color wheel 103 and then enter the integration rod 116. In the embodiment, the color wheel 103 includes light filter sheets and/or light-transmissive sheets corresponding to different color lights, and can rotate in synchronization with the wavelength conversion device 102, for allowing the projection system to have better color performance.

As shown in FIG. 2 and FIG. 3, the wavelength conversion device 102 of the embodiment further includes a substrate 1023. The substrate 1023 has a first surface S1, a second surface S2, and an axis center C. The first surface S1 of the substrate 1023 is opposite to the second surface S2. The first wavelength conversion portion 1021 and the second wavelength conversion portion 1022 are disposed at the first surface S1 of the substrate 1023. The first wavelength conversion portion 1021 and the second wavelength conversion portion 1022 surround the axis center C of the substrate 1023 and both are formed in a ring shape.

As shown in FIG. 1 to FIG. 3, the substrate 1023 of the embodiment is, for example, a transparent substrate. The wavelength conversion device 102 further includes a plurality of reflective layers 1024. The reflective layers 1024 are disposed at the first surface S1 of the substrate 1023. A reflective layer (not shown) is disposed between the first wavelength conversion portion 1021 and the first surface S1 of the substrate 1023 for reflecting the first color beam YL and the third color beam GL. The reflective layers 1024 are respectively located between the corresponding wavelength conversion structures P and the first surface S1. That is, a reflective layer 1024 is disposed between each of the wavelength conversion structures P and the first surface S1. In the embodiment, the reflective layers 1024 are used for reflecting the predetermined color beam BL' generated by exciting the wavelength conversion structures P. In the embodiment, since the substrate 1023 is a transparent substrate, the second color beam BL having the same wavelength as the excitation beam EL directly passes through the wavelength maintenance zone Z of the second wavelength conversion portion 1022. It is worth mentioning that disposing a reflective layer 1024 between each of the wavelength conversion structures P and the first surface S1 as described above is only an embodiment of the invention, and the invention is not limited thereto. In other embodiments, the reflective layers 1024 may also be replaced with reflective diffusion layers having both scattering and reflection functions for diffusing and reflecting the predetermined color beam BL', thereby reducing a speckle phenomenon formed by the projection beam L3 on a projection screen.

As shown in FIG. 1 to FIG. 3, the wavelength conversion device 102 of the embodiment further includes a diffusion layer 1025. The diffusion layer 1025 is disposed at the first surface S1 of the substrate 1023. The diffusion layer 1025 is located in the wavelength maintenance zone Z of the second wavelength conversion portion 1022. When a portion of the excitation beam EL is incident on the wavelength maintenance zone Z of the second wavelength conversion portion 1022, the portion of the excitation beam EL is scattered by the diffusion layer 1025 and then passes through the substrate 1023 to form the second color beam BL, thereby reducing the speckle phenomenon formed by the projection beam L3 on the projection screen. It should be particularly noted that disposing the diffusion layer 1025 in the wavelength maintenance zone Z of the second wavelength conversion portion 1022 as described above is just one of embodiments of the invention, and the invention is not limited thereto. In other embodiments, the diffusion layer 1025 may not be disposed in the wavelength maintenance zone Z of the second wavelength conversion portion 1022.

Figure 5:
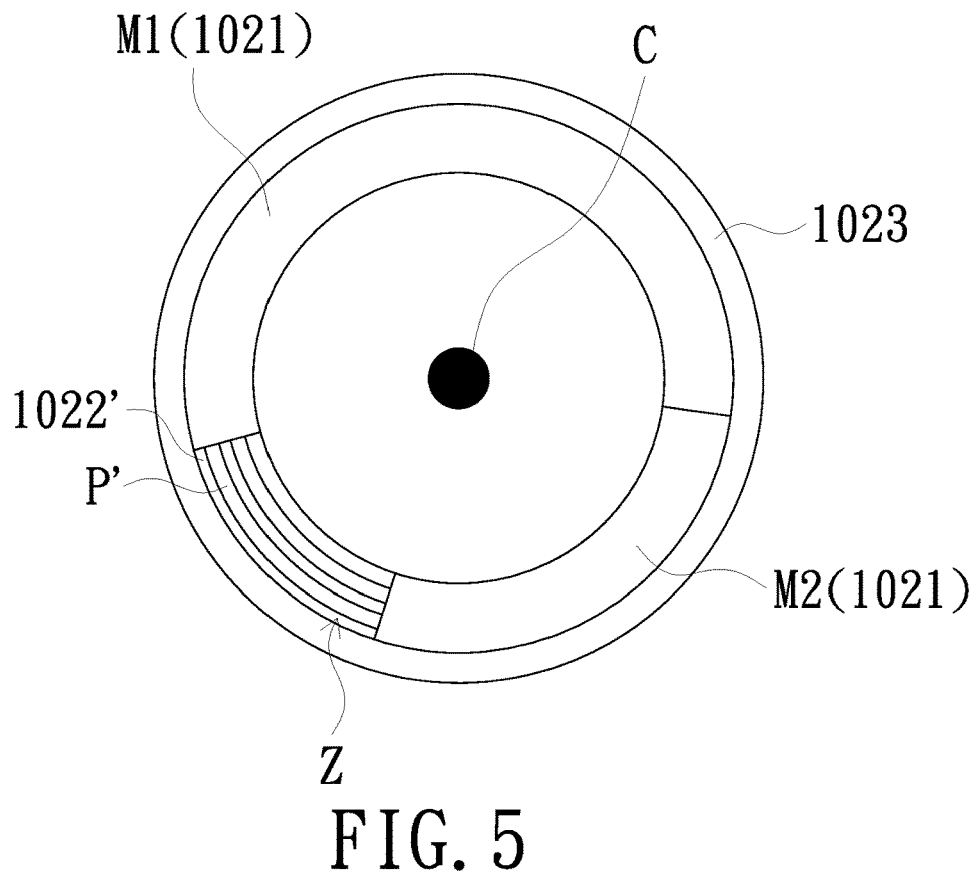
FIG. 5 is a schematic structure diagram of a wavelength conversion device according to another embodiment of the invention.
Figure 6:
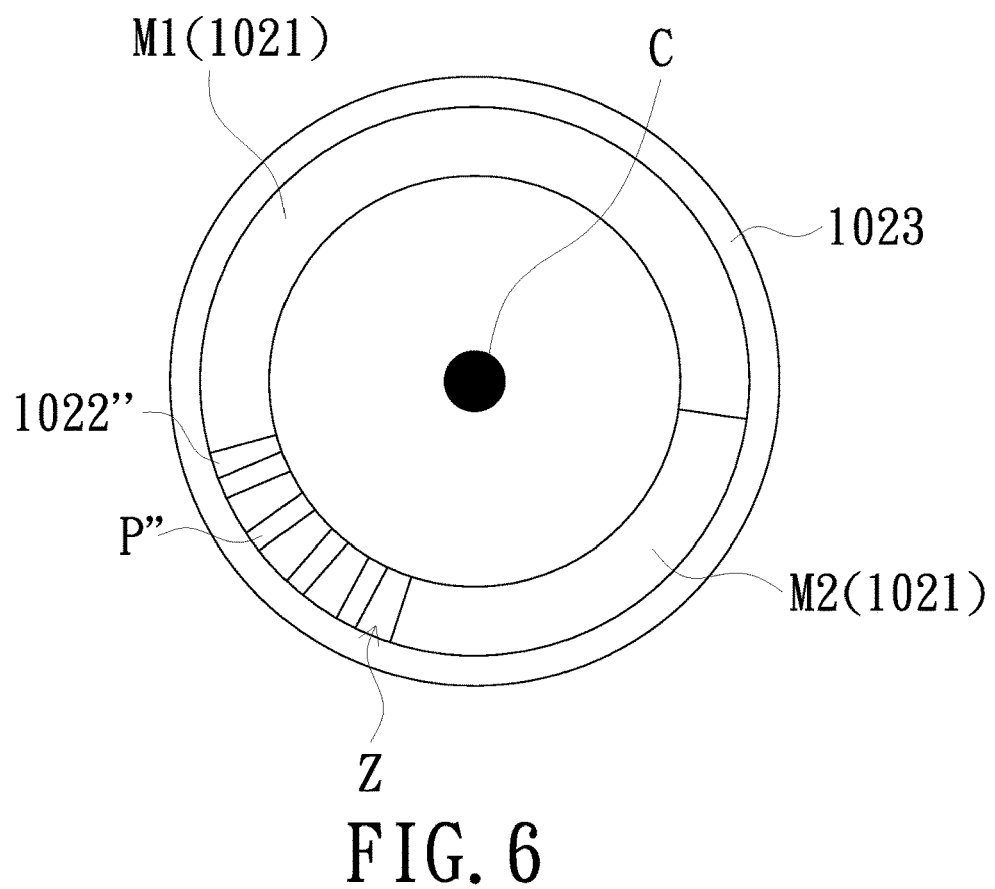
FIG. 6 is a schematic structure diagram of a wavelength conversion device according to another embodiment of the invention.

As shown in FIG. 1 to FIG. 3, the wavelength conversion structures P of the embodiment are, for example, dot-shaped microstructures that are not connected to one another. The dot-shaped microstructures are randomly distributed in the second wavelength conversion portion 1022. Each of the wavelength conversion structures P with an outer shape of the dot-shaped microstructure has an arc surface S3. Furthermore, in the embodiment, an area of the wavelength conversion structures P distributed in the second wavelength conversion portion 1022 is A1. An area of the wavelength maintenance zone Z distributed in the second wavelength conversion portion 1022 is A2. The ratio of A1/(A1+A2) is between 1/10 and 4/5. That is, a conversion rate, where the excitation beam EL is incident to the second wavelength conversion portion 1022 and excites the wavelength conversion structures P to become the predetermined color beam BL', is greater than or equal to 10% and less than or equal to 80%. In addition, the wavelength conversion structures P of the embodiment are formed in the second wavelength conversion portion 1022 by screen printing or steel plate printing. However, the invention does not limit the manner in which the wavelength conversion structures P are formed. It should be particularly noted that the wavelength conversion structures P being the dot-shaped microstructures is just one of embodiments of the invention, but the invention is not limited thereto. In other embodiments, the wavelength conversion structures have a gap between one another, and the wavelength conversion structures constitute a specific pattern. For example, as shown in FIG. 5, the pattern constituted by the wavelength conversion structures P' of a second wavelength conversion portion 1022' is, for example, a plurality of arc-shaped strip-like structures. The arc-shaped strip-like structures are centered on the axis center C of the substrate 1023 and concentrically arranged in a direction away from the axis center C. As shown in FIG. 6, the wavelength conversion structures P'' of a second wavelength conversion portion 1022'' are, for example, a plurality of strip-like structures. The strip-like structures radially extend in a direction away from the axis center C of the substrate 1023, respectively. The strip-like structures are arranged and spaced from one another.

Figure 7:
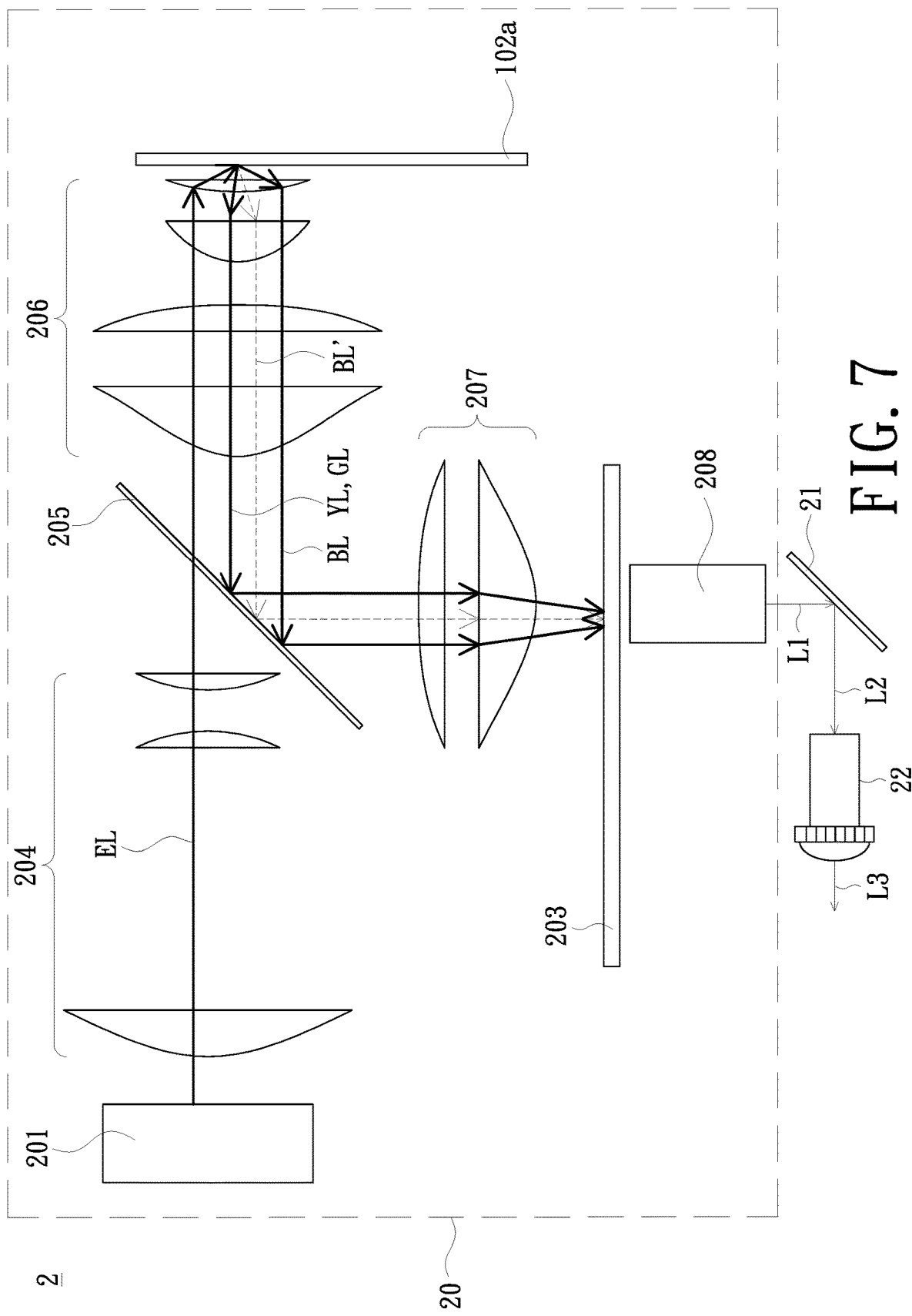
FIG. 7 is a schematic architecture diagram of a projection system according to another embodiment of the invention.

FIG. 7 is a schematic architecture diagram of a projection system according to another embodiment of the invention. A projection system 2 of the embodiment includes a light source module 20, a light valve 21, and a lens 22. The light source module 20 includes a light source device 201, a wavelength conversion device 102a, a dichroic element 205, a first lens group 204, a color wheel 203, a second lens group 206, a third lens group 207, and an integration rod 208. In the embodiment, the excitation beam EL provided by the light source device 201 is, for example, a blue beam. The first color beam YL is, for example, a yellow beam. The third color beam GL is, for example, a green beam. The predetermined color beam BL' is, for example, a greenish or yellowish beam. The dichroic element 205 is disposed between the wavelength conversion device 102a and the light source device 201. A first area of the dichroic element 205 (not labeled, such as an upper half area of the dichroic element 205 in FIG. 7) is located on the transmission path of the excitation beam EL, and is for allowing a blue beam to pass therethrough and reflecting other color beams. A second area (not labeled, such as a lower half area of the dichroic element 205 in FIG. 7) is not located on the transmission path of the excitation beam EL, and is for reflecting beams of all colors. The color wheel 203 can, for example, synchronously rotate with the wavelength conversion device 102a.

Figure 8:
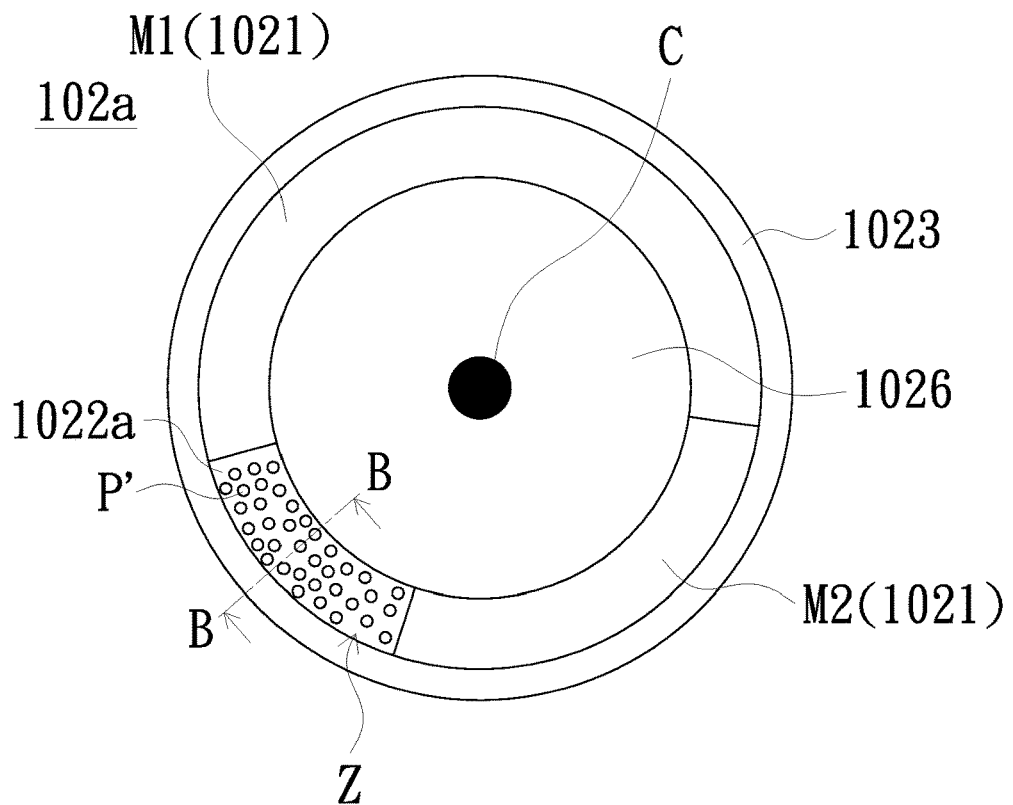
FIG. 8 is a schematic structure diagram of a wavelength conversion device shown in FIG. 7.
Figure 9:
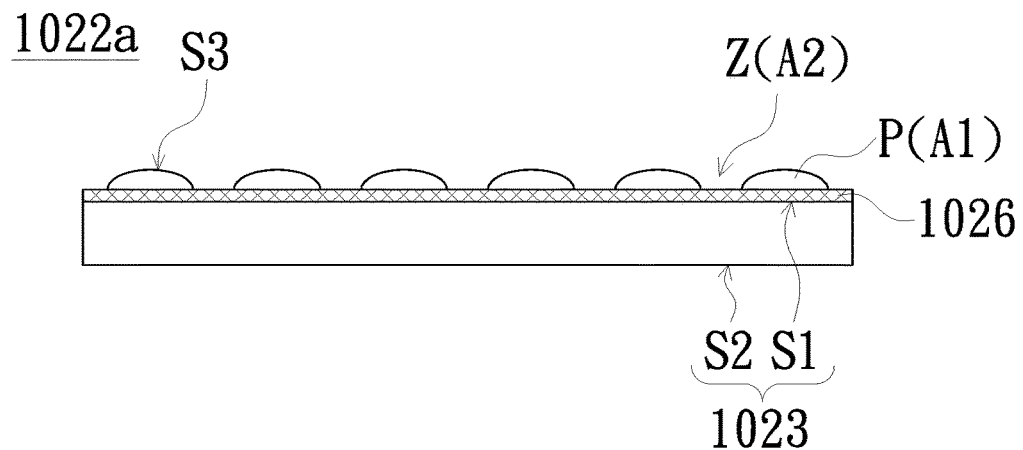
FIG. 9 is a schematic view along line B-B shown in FIG. 8.

FIG. 8 is a schematic structure diagram of the wavelength conversion device shown in FIG. 7. FIG. 9 is a schematic view along line B-B shown in FIG. 8. The wavelength conversion device 102a of the embodiment is similar to the wavelength conversion device 102 shown in FIG. 1 to FIG. 3. The difference is that the wavelength conversion device 102a of the embodiment includes a reflective layer 1026. The reflective layer 1026 is disposed at the first surface S1 of the substrate 1023. The reflective layer 1026 is located between the first wavelength conversion portion 1021 and the first surface S1 and between the second wavelength conversion portion 1022a and the first surface S1. That is, the first wavelength conversion portion 1021 and the second wavelength conversion portion 1022a are respectively disposed on the reflective layer 1026. In the embodiment, the reflective layer 1026 is used for reflecting the first color beam YL and the third color beam GL generated by exciting the first wavelength conversion material M1 and the second wavelength conversion material M2 of the first wavelength conversion portion 1021, respectively. The reflective layer 1026 is used for reflecting the second color beam BL irradiated at the wavelength maintenance zone Z and the predetermined color beam BL' generated by exciting the wavelength conversion structures P.

As shown in FIG. 7 to FIG. 9, when the first wavelength conversion material M1 of the first wavelength conversion portion 1021 is switched onto the transmission path of the excitation beam EL, the excitation beam EL sequentially passes through the first lens group 204, the first area of the dichroic element 205, and the second lens group 206, and is transmitted to the wavelength conversion device 102a. The excitation beam EL irradiates the first wavelength conversion material M1 and the first color beam YL is generated by exciting the first wavelength conversion material M1. When the second wavelength conversion material M2 of the first wavelength conversion portion 1021 is switched onto the transmission path of the excitation beam EL, the excitation beam EL sequentially passes through the first lens group 204, the first area of the dichroic element 205, and the second lens group 206, and is transmitted to the wavelength conversion device 102a. The excitation beam EL irradiates the second wavelength conversion material M2 and the third color beam GL is generated by exciting the second wavelength conversion material M2. The first color beam YL and the third color beam GL are reflected by the reflective layer 1026 and pass through the second lens group 206 to be transmitted to the dichroic element 205. Then, the first color beam YL and the third color beam GL pass through the third lens group 207 and irradiate the rotatable color wheel 203, after being reflected by the dichroic element 205 (the first area and the second area), respectively. After passing through the color wheel 203, the first color beam YL and the third color beam GL enter the integration rod 208. When the second wavelength conversion portion 1022a is switched onto the transmission path of the excitation beam EL, the excitation beam EL sequentially passes through the first lens group 204, the first area of the dichroic element 205, and the second lens group 206, and is transmitted to the wavelength conversion device 102a. A portion of the excitation beam EL is incident on the wavelength maintenance zone Z and becomes the second color beam BL. Another portion of the excitation beam EL is incident on the wavelength conversion structures P and converted into the predetermined color beam BL'. The second color beam BL and the predetermined color beam BL' are reflected by the reflective layer 1026 and pass through the second lens group 206 to be transmitted to the dichroic element 205. Then, the second color beam BL, after being reflected by the second area of the dichroic element 205, and the predetermined color beam BL', after being reflected by the first area and the second area of the dichroic element 205, are combined and pass through the third lens group 207 and irradiate the rotatable color wheel 203. After passing through the color wheel 203, the second color beam BL and the predetermined color beam BL' enter the integration rod 208.

Figure 10:
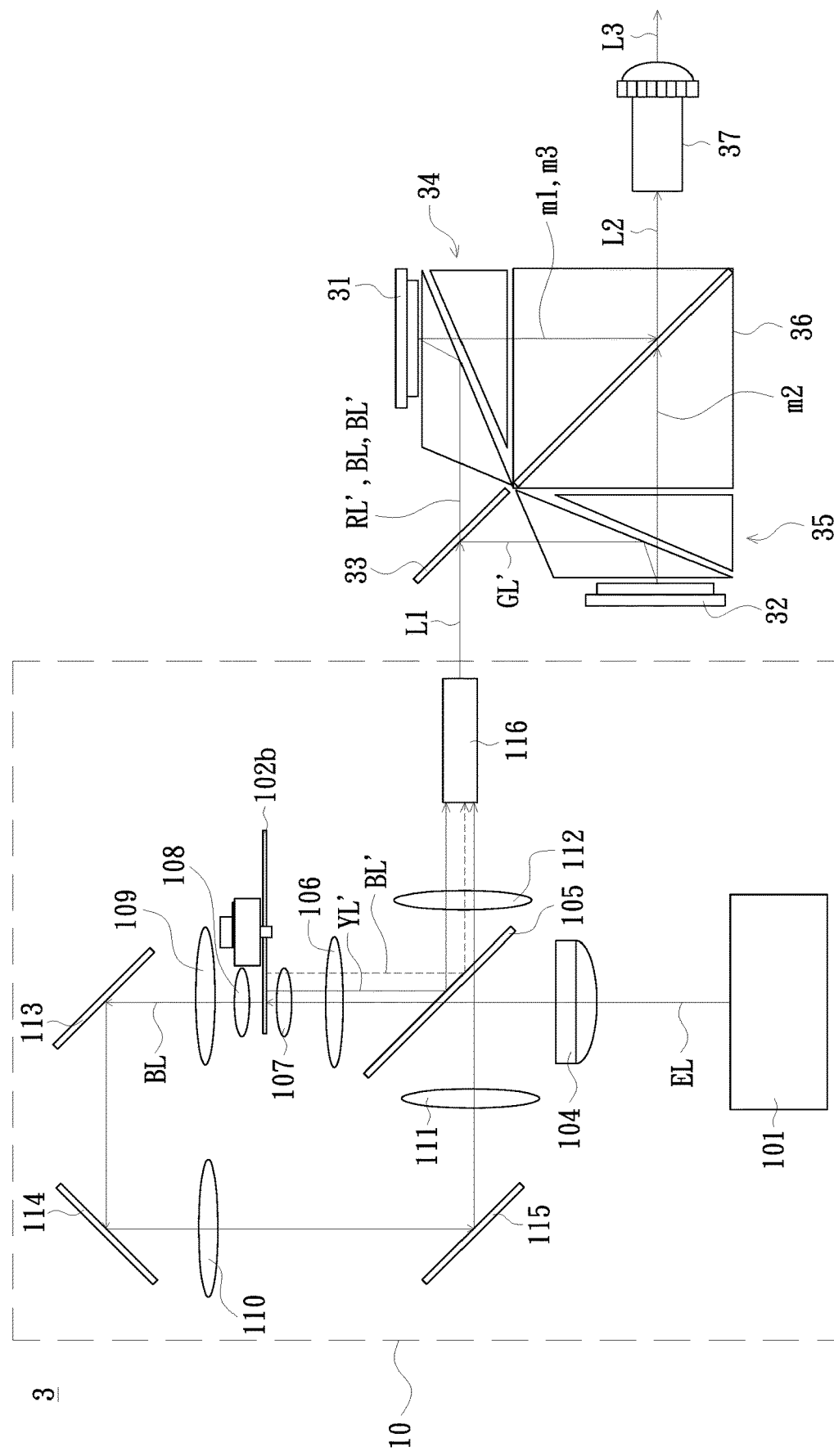
FIG. 10 is a schematic architecture diagram of a projection system according to another embodiment of the invention.

FIG. 10 is a schematic architecture diagram of a projection system according to another embodiment of the invention. A projection system 3 of the embodiment is similar to the projection system 1 shown in FIG. 1. The difference is that the projection system 3 of the embodiment includes a first light valve 31, a second light valve 32, a dichroic element 33, a first prism group 34, a second prism group 35, a light combining element 36, and a lens 37. In the embodiment, the projection system 3 omits the color wheel (the color separating element 103) shown in FIG. 1 and uses another kind of the dichroic element 33. In the embodiment, the dichroic element 33 is, for example, a dichroic mirror. In addition, the first wavelength conversion portion of a wavelength conversion device 102b of the embodiment has only one wavelength conversion material. Other structures of the wavelength conversion device 102b of the embodiment are similar to those of the wavelength conversion device 102 shown in FIG. 2.

As shown in FIG. 10, the dichroic element 33 of the projection system 3 of the embodiment can, for example, reflect a green beam of a specific wavelength band and allow beams of other colors to pass therethrough. Then, the dichroic element 33 can divide a yellow beam YL' (similar to the first color beam YL shown in FIG. 1), generated by the wavelength conversion device 102b, into a green beam GL' and a red beam RL'. The red beam RL' and the green beam GL' are transmitted to the first prism group 34 and the second prism group 35 in different directions, respectively. The red beam RL' is transmitted to the first light valve 31 via the first prism group 34. The first light valve 31 is adapted to receive the red beam RL' to generate a first sub-image beam m1 and reflect the first sub-image beam m1 to the light combining element 36. The green beam GL' is transmitted to the second light valve 32 via the second prism group 35. The second light valve 32 is adapted to receive the green beam GL' to generate a second sub-image beam m2 and reflect the second sub-image beam m2 to the light combining element 36. Furthermore, a blue beam (similar to the second color beam BL shown in FIG. 1) and a greenish or yellowish beam (similar to the predetermined color beam BL' shown in FIG. 1), generated by the wavelength conversion device 102b, are combined through the dichroic element 105 and then transmitted to the dichroic element 33. The blue beam and most of the predetermined color beam BL' pass through the dichroic element 33 to form a mixed beam (not numbered) which is transmitted to the first prism group 34, and then are transmitted to the first light valve 31 via the first prism group 34, respectively. The first light valve 31 is adapted to convert the mixed beam into a third sub-image beam m3 and to reflect the third sub-image beam m3 to the light combining element 36. Then, the light combining element 36 combines the first sub-image beam m1, the second sub-image beam m2, and the third sub-image beam m3 into the image beam L2. The image beam L2 becomes the projection beam L3 after passing through the lens 37.

It should be particularly noted that in architecture of the projection system 3 of the embodiment, the light source module 10 may also be replaced with a light source module 20 architecture shown in FIG. 7. When the light source module 10 of the embodiment is replaced with the light source module 20 architecture shown in FIG. 7, the color wheel 203 shown in FIG. 7 also needs to be omitted and replaced with the dichroic element 33 (a dichroic mirror) shown in FIG. 10.

It should be particularly noted that the wavelength conversion device 102 shown in FIG. 1 to FIG. 3 and the wavelength conversion device 102a shown in FIG. 7 to FIG. 9 may also be applied to projection system architectures with three-piece light valves. No matter the architectures shown in FIG. 1 to FIG. 3 or the architectures shown in FIG. 7 to FIG. 9, all can achieve an objective of adjusting the color of a blue beam, thereby enhancing the quality of the image pictures projected by projectors.

In summary, the wavelength conversion device of the embodiment of the invention is used in projectors, and includes the first wavelength conversion portion and the second wavelength conversion portion having different excitation beam conversion rates. The second wavelength conversion portion includes a wavelength maintenance zone and a plurality of wavelength conversion structures. In such a structural design, when the second wavelength conversion portion is switched onto the transmission path of the excitation beam, a portion of the excitation beam is incident on the wavelength maintenance zone and the excitation beam is allowed to maintain in the blue color light, and another portion of the excitation beam is incident on the wavelength conversion structures and converted into the yellowish or greenish color light. After the blue light is combined with the yellowish or greenish color light by the dichroic element, purplish blue light is adjusted to bluish color light, so that the adjusted beam color is closer to pure blue. The quality of the image pictures projected by projectors is thereby enhanced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first wavelength conversion portion, the second wavelength conversion portion, the first lens group, the second lens group, the third lens group, the first light valve, the second light valve, the first prism group, the second prism group, the first wavelength conversion material, the second wavelength conversion material, the first surface, the second surface, the first color beam, the second color beam, the third color beam, the first sub-image beam, the second sub-image beam, the third sub-image beam, the first chromaticity coordinate value, the second chromaticity coordinate value, the first area, and the second area are only used for distinguishing various elements and do not limit the number of the elements.

What is claimed is:

1. A wavelength conversion device, wherein the wavelength conversion device is located on a transmission path of an excitation beam, and the wavelength conversion device comprises:
    a first wavelength conversion portion, wherein the first wavelength conversion portion is configured with at least one wavelength conversion material, and is used for receiving the excitation beam and converting the excitation beam into a first color beam; and
    a second wavelength conversion portion, wherein the second wavelength conversion portion comprises a wavelength maintenance zone, at least one reflective layer and a plurality of wavelength conversion structures disposed on the at least one reflective layer,
    wherein the second wavelength conversion portion and the first wavelength conversion portion are alternately switched onto the transmission path of the excitation beam,
    when the second wavelength conversion portion is switched onto the transmission path of the excitation beam, a portion of the excitation beam is incident on the wavelength maintenance zone and becomes a second color beam, and another portion of the excitation beam is incident on the wavelength conversion structures and converted into a predetermined color beam,
    wherein the at least one reflective layer is configured to reflect the predetermined color beam and the second color beam irradiated at the wavelength maintenance zone;
    wherein an area of the wavelength conversion structures of the second wavelength conversion portion is A1, an area of the wavelength maintenance zone is A2, and a ratio of A1/(A1+A2) is between 1/10 and 4/5;
    wherein a first chromaticity coordinate value of the second color beam in color space is (x, y), a second chromaticity coordinate value of the second color beam combined with the predetermined color beam in the color space is (x', y'), and x'≤x and y'≥y.

2. The wavelength conversion device according to claim 1, wherein the wavelength conversion device further comprises a substrate, the substrate has a first surface, a second surface and an axis center, the first surface is opposite to the second surface, and the first wavelength conversion portion and the second wavelength conversion portion are disposed at the first surface of the substrate and surround the axis center.

3. The wavelength conversion device according to claim 2, wherein the at least one reflective layer is disposed at the first surface of the substrate, and the reflective layer is located between the first wavelength conversion portion and the first surface and between the second wavelength conversion portion and the first surface and is for reflecting the first color beam, the second color beam and the predetermined color beam.

4. The wavelength conversion device according to claim 2, wherein the substrate is a transparent substrate, the at least one reflective layer comprises a plurality of reflective layers, the plurality of reflective layers are disposed at the first surface of the substrate, the plurality of reflective layers are respectively located between the corresponding wavelength conversion structures and the first surface and are for reflecting the predetermined color beam, and the portion of the excitation beam passes through the wavelength maintenance zone to become the second color beam.

5. The wavelength conversion device according to claim 4, wherein the wavelength conversion device further comprises a diffusion layer, the diffusion layer is disposed at the first surface of the substrate, and the diffusion layer is located in the wavelength maintenance zone of the second wavelength conversion portion.

6. The wavelength conversion device according to claim 2, wherein on the first surface of the substrate, the wavelength conversion structures have a gap between one another, and the wavelength conversion structures constitute a pattern.

7. The wavelength conversion device according to claim 6, wherein the pattern is a plurality of arc-shaped strip-like structures, and the arc-shaped strip-like structures are centered on the axis center and concentrically arranged in a direction away from the axis center.

8. The wavelength conversion device according to claim 6, wherein the pattern is a plurality of strip-like structures, the strip-like structures radially extend in a direction away from the axis center respectively, and the strip-like structures are arranged and spaced from one another.

9. The wavelength conversion device according to claim 1, wherein the wavelength conversion structures are respectively dot-shaped microstructures, the dot-shaped microstructures are randomly distributed in the second wavelength conversion portion, and each of the dot-shaped microstructures has an arc surface.

10. The wavelength conversion device according to claim 1, wherein the number of the at least one wavelength conversion material is two, the wavelength conversion materials are respectively a first wavelength conversion material and a second wavelength conversion material, the first wavelength conversion material is used for converting the excitation beam into a yellow beam, and the second wavelength conversion material is used for converting the excitation beam into a green beam.

11. The wavelength conversion device according to claim 1, wherein a conversion rate, with which the excitation beam is incident on the first wavelength conversion portion and converted into the first color beam, is greater than or equal to 90%.

12. The wavelength conversion device according to claim 1, wherein the dichroic element is a dichroic prism or a dichroic mirror.

13. A projection system, comprising a wavelength conversion device, a light source device and a dichroic element, wherein the light source device provides an excitation beam, the wavelength conversion device is located on a transmission path of the excitation beam, and the wavelength conversion device comprises:
a first wavelength conversion portion, wherein the first wavelength conversion portion is configured with at least one wavelength conversion material, and is used for receiving the excitation beam and converting the excitation beam into a first color beam; and
a second wavelength conversion portion, wherein the second wavelength conversion portion comprises a wavelength maintenance zone, at least one reflective layer and a plurality of wavelength conversion structures disposed on the at least one reflective layer;
wherein the second wavelength conversion portion and the first wavelength conversion portion are alternately switched onto the transmission path of the excitation beam,
wherein the at least one reflective layer is configured to reflect the predetermined color beam and the second color beam irradiated at the wavelength maintenance zone;
wherein an area of the wavelength conversion structures of the second wavelength conversion portion is A1, an area of the wavelength maintenance zone is A2, and a ratio of A1/(A1+A2) is between 1/10 and 4/5;
wherein a first chromaticity coordinate value of the second color beam in color space is (x, y), a second chromaticity coordinate value of the second color beam combined with the predetermined color beam in the color space is (x', y'), and x'≤x and y'≥y.

* * * * *